(12) United States Patent
Shimizu et al.

(10) Patent No.: US 8,630,029 B2
(45) Date of Patent: *Jan. 14, 2014

(54) METHOD OF READING DOCUMENT IMAGE DATA

(75) Inventors: Natsuki Shimizu, Yamanashi-ken (JP);
Tatsuya Omori, Yamanashi-ken (JP);
Kazuto Nezu, Yamanashi-ken (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 72 days.

This patent is subject to a terminal disclaimer.

(21) Appl. No.: 13/476,440

(22) Filed: May 21, 2012

(65) Prior Publication Data

US 2012/0229868 A1 Sep. 13, 2012

Related U.S. Application Data

(63) Continuation of application No. 12/457,523, filed on Jun. 15, 2009, now Pat. No. 8,305,657.

(30) Foreign Application Priority Data

Jun. 17, 2008 (JP) ................. 2008-157436

(51) Int. Cl.
*H04N 1/04* (2006.01)
*H04N 1/32* (2006.01)
*H04N 1/36* (2006.01)
*H04N 1/00* (2006.01)

(52) U.S. Cl.
USPC ........... 358/498; 358/496; 358/442; 358/468; 358/474; 358/404; 358/444; 358/412; 358/413; 358/1.15; 358/1.16

(58) Field of Classification Search
USPC ......... 358/498, 496, 404, 444, 437, 409, 412, 358/468, 442, 474, 407, 1.15, 1.16, 1.13, 358/413, 403; 382/305, 306
See application file for complete search history.

(56) References Cited

U.S. PATENT DOCUMENTS 5,825,512 A * 10/1998 Okita ............................. 358/496
5,896,203 A * 4/1999 Shibata ........................ 358/404

(Continued)

FOREIGN PATENT DOCUMENTS

JP 2001-223838 A 8/2001
JP 2001223838 A * 8/2001

OTHER PUBLICATIONS

Japan Patent Office, "Office Action for JP 2008-157436", Sep. 21, 2012.

*Primary Examiner* — Cheukfan Lee
(74) *Attorney, Agent, or Firm* — Manabu Kanesaka

(57) ABSTRACT

A method of reading document image data and transferring the image data to a data reception apparatus, includes setting memory areas for storing the image data in a data storage section and setting a reading condition, upon receipt of a scan start command; transmitting the scan start command for instructing the scanner apparatus to start operations; instructing the scanner apparatus to transmit the image data to a transfer data storage section; transferring the image data in the transfer data storage section to the data storage section in response to a data transferring request command; transmitting a document end signal to the data storage section; executing feeding of subsequent document sheets, without transmitting another scan start command; determining whether distance from a rear end is a predetermined length or more, and an available space is a predetermined amount or more; and controlling a feeding section based on determination results.

5 Claims, 13 Drawing Sheets

(56) References Cited

U.S. PATENT DOCUMENTS 7,724,387 B2 * 5/2010 Ochiai et al. ................ 358/1.15
8,305,657 B2 * 11/2012 Shimizu et al. ............... 358/498
2006/0132821 A1 * 6/2006 Nonaka et al. ............... 358/1.13
2008/0226371 A1 * 9/2008 Oshima ........................ 399/397
2009/0040560 A1 * 2/2009 Yukiura et al. ............... 358/1.16

* cited by examiner

FIG. 12

IMAGE
○ COLOR    ● MONOCHROME

RESOLUTION (dpi)
○ 200    ● 400    ○ 600

ORIGINAL DOCUMENT SIZE
● A4    ○ A3

SCAN

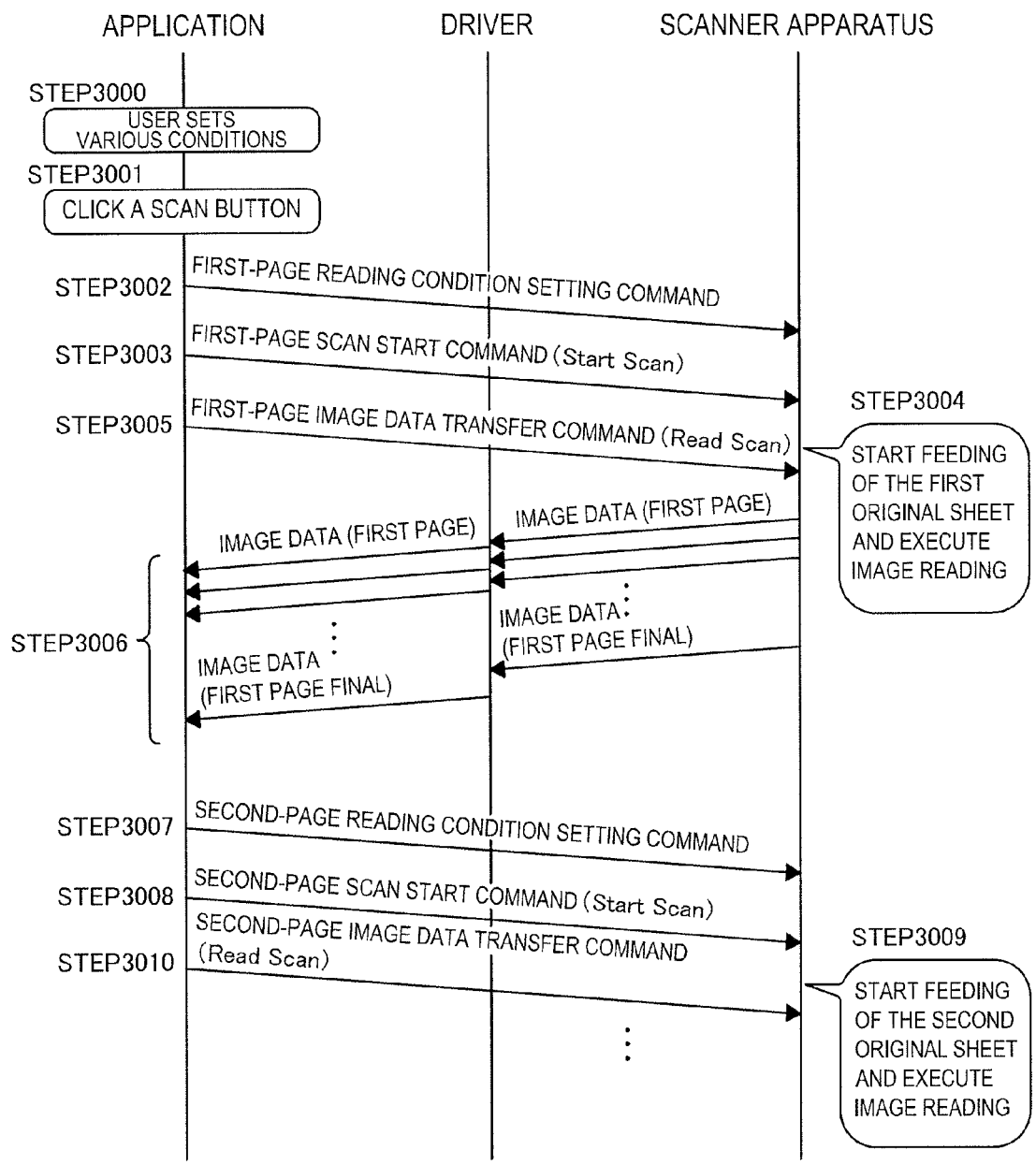

METHOD OF READING DOCUMENT IMAGE DATA

CROSS-REFERENCE TO RELATED APPLICATION

This is a continuation application of Ser. No. 12/457,523 filed on Jun. 15, 2009.

BACKGROUND OF THE INVENTION

1. Technical Field

The present invention relates to a method of reading document image data scanned by a scanner apparatus and of transferring the image data to a data reception apparatus.

2. Description of the Related Art

An image reading system in which a scanner apparatus is connected to a data reception apparatus such as a computer apparatus or the like has been known widely (for example, Japanese Laid-Open Patent Publication No. H10-260927).

The scanner apparatus in such a system is configured to read an image of an original document using an image sensor such as a CCD or the like, perform 2/multivalue conversion (A/D conversion) on the image data to make various corrections, and then, transfer the data to the data reception apparatus.

Meanwhile, the data reception apparatus is comprised of a central processing unit (CPU), HDD (hard disk) for storing execution programs such as application programs, driver programs and the like, memory (RAM) for storing various kinds of data, keyboard, monitor screen and the like to be direct interfaces with a user, etc. and is configured to execute a variety of processing corresponding to a purpose of the user.

The scanner apparatus and data reception apparatus are connected via an interface such as, for example, RS232C, SCSI, USB, PCe, Ethernet or the like, and the scanner apparatus is operated via the driver program according to descriptions instructed on the application program screen by the user, and performs up to transfer of image data starting with reading the original document. In addition, the driver program is formed of, for example, a general-purpose driver program conforming to specifications such as TWAIN, ISIS or the like.

Herein, a conventional example is described in the case where the scanner apparatus of the above-mentioned system has an original document transport mechanism, and reads an original document transported by the original document transport mechanism.

First, a user sets reading conditions such as resolution, document size, color/monochrome and the like on an application screen displayed on a screen of a computer (hereinafter, referred to as a PC) as shown in FIG. 12 (STEP 3000), and selects a scan button for instructing the apparatus to start reading (STEP 3001). After the user selects the scan button, the following exchange shown in FIG. 13 is performed between the application and driver, and between the driver and scanner apparatus.

The application first initializes the scanner apparatus via the driver (not shown), and then, transmits a "reading condition setting command" that is a command for requesting a reading condition setting of the first page, and the scanner apparatus receives this command via the driver (STEP 3002). Next, the application transmits a "scan start command (Start Scan)" that is a command for requesting scanning of the first page (STEP 3003), and the scanner apparatus receiving this scan start command transports the first original sheet to a predetermined reading position, and drives a reading sensor formed of a CCD or the like to read the first original sheet image (STEP 3004).

Next, the scanner apparatus receives an "image data transfer command" for requesting transfer of image data of the first page from the application (STEP 3005), and after receiving the command, transfers the image data of the first page to the driver, and the driver transmits the data to the application (STEP 3006). After receiving all the image data of the first page, the application inquires of the scanner apparatus whether or not a next original sheet is present (not shown). When the next original sheet is present, the application transmits a reading condition setting command of the second page (STEP 3007), and then, transmits a scan start command of the second page (STEP 3008). These commands are transmitted to the scanner apparatus. The scanner apparatus receives the scan start command of the second page, and then, feeds the second original sheet to read the image (STEP 3009). Then, as in STEP 3005 and STEP 3006 as described above, the scanner apparatus transfers the image data in response to the image data transfer command (STEP 3010).

As described above, in the conventional image reading system, a scan start command (Start Scan) is transmitted from the application program on a page basis, and the scanner apparatus starts feeding an original sheet of the next page after receiving the scan start command. Therefore, during transferring the image data to the PC from the scanner apparatus, even when the scanner apparatus side is in conditions capable of reading the next original sheet, the scanner apparatus cannot feed and read the next original sheet, and the time required for the entire processing becomes long.

Further, conventionally, before the application outputs an image scan instruction signal (Start Scan) after acquiring image data corresponding to one page, the driver and scanner apparatus exchange commands and responses for checking whether or not the next original sheet is present and the like, and the image scan instruction signal (Start Scan command) is first output after the exchange is finished. The exchange between the driver and the scanner apparatus is performed by communications therebetween, requires a time, further delays output of the image scan instruction signal (Start Scan command) corresponding to the time, and thereby increases useless time during which feeding and reading of the next original sheet is not performed. Then, the effect of the communication time on the entire processing time increases, as the number of original document sheets to read consecutively increases.

Therefore, it is an object of the present invention to reduce the entire processing time of from original document reading to image transfer when a scanner apparatus consecutively reads a plurality of image original document sheets in a system where the image data read by the scanner apparatus is transferred to a data reception apparatus.

BRIEF SUMMARY OF THE INVENTION

To attain the above-mentioned object, the invention provides configurations as described below.

In an image reading system having a scanner apparatus for reading an original document image, and a data reception apparatus for receiving image data transferred from the scanner apparatus, the data reception apparatus has a receiving section that receives image data transferred from the scanner apparatus, a received data storage section that stores the image data received in the receiving section, and a driver program executing section that executes a driver program for operating the scanner apparatus to transmit a scan start command for instructing the scanner apparatus to start reading operation to the scanner apparatus, the scanner apparatus has a feeding section that feeds an original document sheet to a predetermined reading position, a reading sensor that reads an image of the original document sheet fed by the feeding section, a transfer data storage section that stores image data from the reading sensor, a transfer section that transfers the image data stored in the transfer data storage section to the data reception apparatus, and a scanner control section that controls the feeding section and the reading sensor, and the scanner control section controls the feeding section independently of the scan start command from the data reception apparatus to start feeding of second and subsequent original document sheets.

In the invention, in a system where a scanner apparatus reads images of a plurality of original document sheets consecutively, and transfers the image data to a data reception apparatus, it is configured that reading of the first original sheet is executed based on an image scan instruction signal (Start Scan command) from an executing means of a driver program of the data reception apparatus, and that successive second and subsequent original document sheets undergo execution of image reading independently regardless of the presence or absence of an image scan instruction signal (Start Scan command), and the following effects are produced.

Conventionally, with respect to second and successive original document sheets subsequent to the first original sheet, after the driver executing section on the data reception apparatus side receives image data of the first original sheet, the scanner apparatus starts image reading after waiting for the image scan instruction signal (Start Scan command) from the driver executing section. In contrast thereto, in the invention, since the scanner apparatus starts image reading independently, it is possible to set an interval time between original document sheets at a minimum limit required for image reading. It is thereby possible to remarkably improve the efficiency of the processing for reading images of a plurality of successive original document sheets.

In other words, the scanner apparatus reads an image of the first original sheet based on a scan instruction signal from the driver executing section on the data reception apparatus side, and with second and subsequent original document sheets, executes image reading consecutively, for example, corresponding to available memory of the scanner apparatus, and it is thereby possible to reduce the interval time.

BRIEF DESCRIPTION OF THE SEVERAL VIEWS OF THE DRAWINGS

FIG. 12 is an explanatory view of an application screen of a conventional image reading system; and FIG. 13 is a diagram illustrating a flow of information of the conventional image reading system.

DETAILED DESCRIPTION OF THE INVENTION

The present invention will specifically be described below based on preferred embodiments of the invention shown in drawings.

Figure 1A:
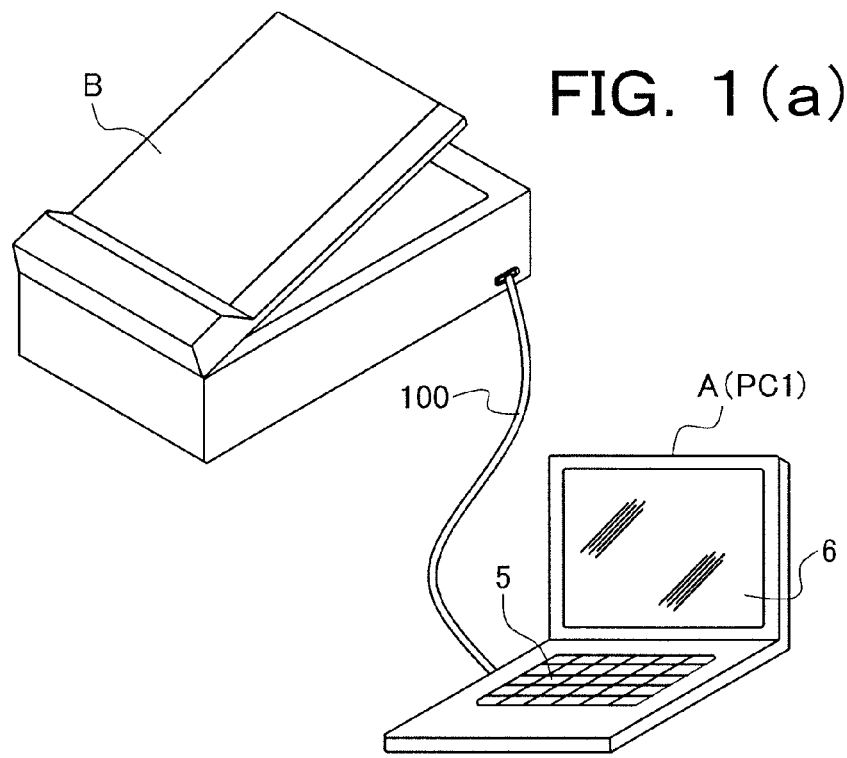
FIG. 1 is an explanatory view of the entire configuration showing an image reading system according to the invention.

An image reading system according to the invention has a personal computer (hereinafter, referred to as PC 1) that is a data reception apparatus A, and a scanner apparatus B. As shown in FIG. 1, the PC 1 and scanner apparatus B are connected with a transmission cable (USB cable) 100, and are configured to serial-transfer image data and control signal mutually.

In addition, the PC 1 may be connected to a network or the like, and the PC1 and scanner apparatus B may be connected via a network, and may be connected in a cable or wireless manner. Further, the scanner apparatus B may be a complex apparatus provided with various functions such as a printer, facsimile and the like, and is only required to read image data.

[Configuration of the Data Reception Apparatus A (PC 1)]

Figure 1B:
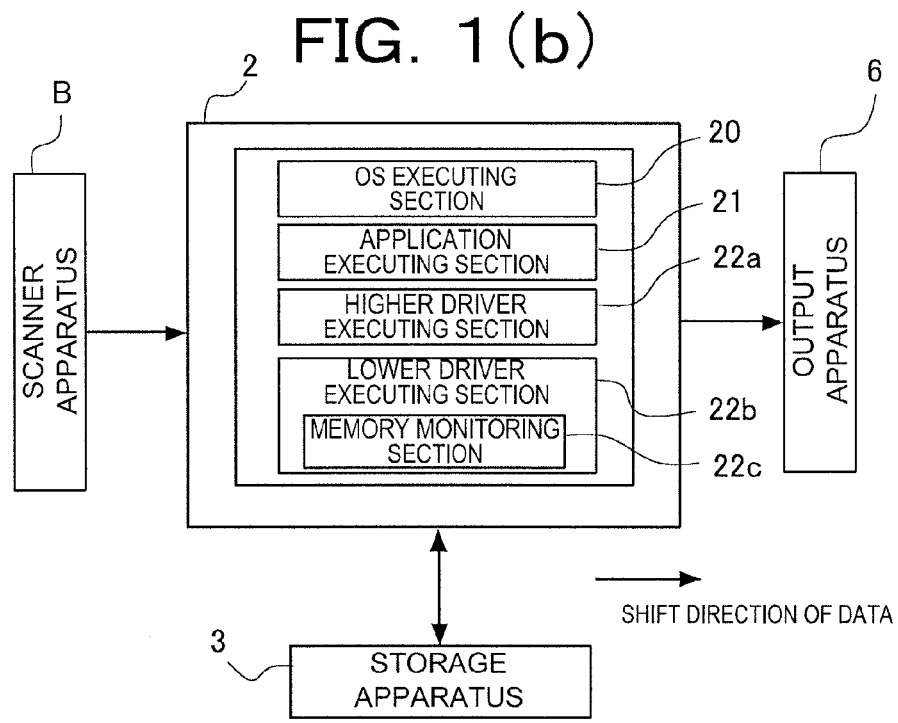
Figure 3:
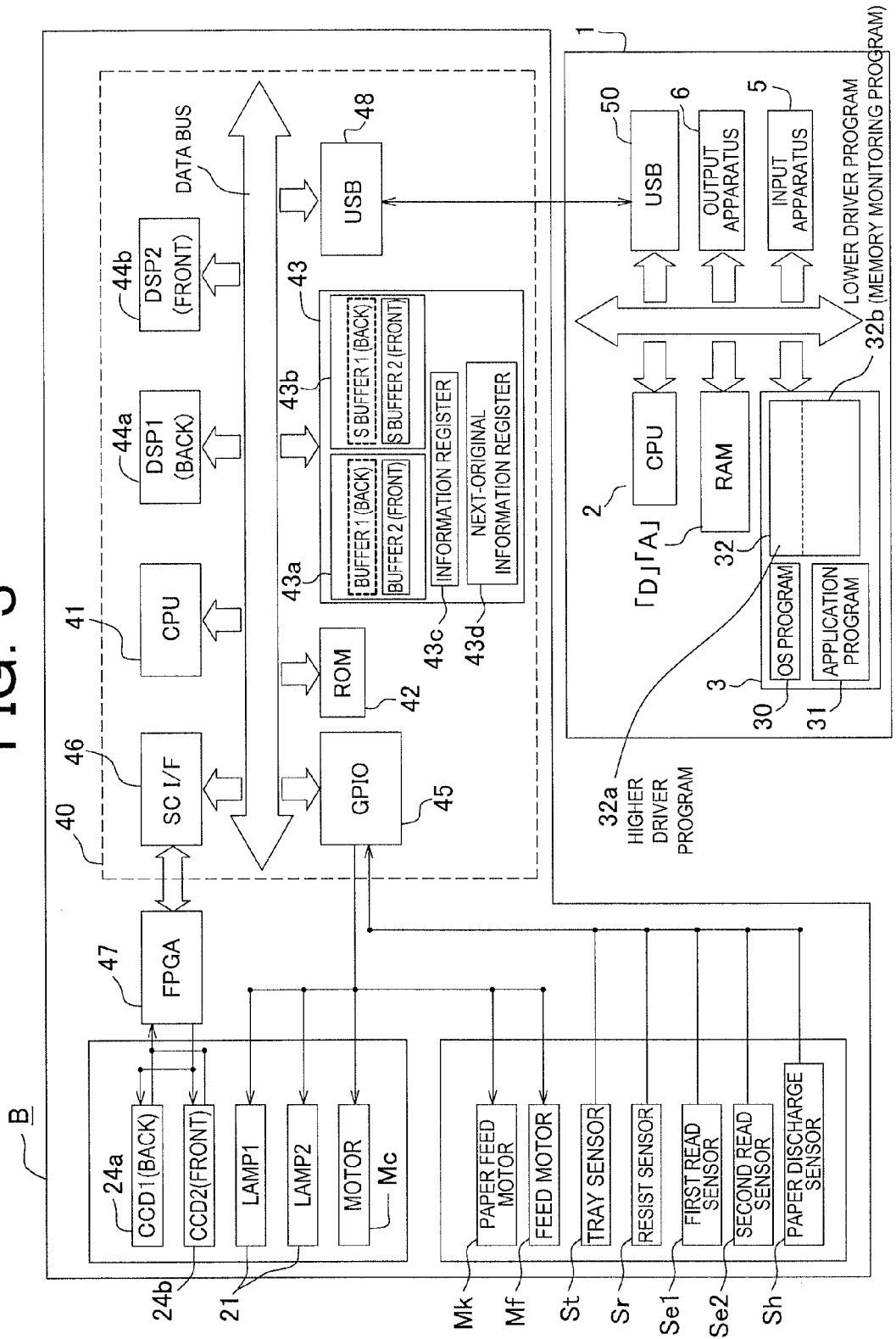
FIG. 3 is a block diagram illustrating a control configuration of the system of FIG. 1 and shows the control configuration between the scanner apparatus and data reception apparatus.

As shown in FIG. 3, the PC 1 has a central processing unit (hereinafter referred to as a "CPU") 2, a storage section 3 formed of a hard disk or the like, an input apparatus 5 such as a key board, an output apparatus 6 such as a monitor screen, and RAM "D" and RAM "A" that is memory for temporarily storing image data and the like. The storage section 3 stores an operating system (OS) program 30, an application program 31 that is a user interface of the scanner apparatus B, and a driver program 32 (higher driver program 32a, lower driver program 32b) for operating the scanner apparatus B, where the CPU 2 executes each of the programs using cache (not shown). Further, the CPU 2 is connected to a data transfer section (USB controller) 48 of the scanner apparatus B via a data receiving section (USB controller) 50. Accordingly, as shown in FIG. 1(b), the CPU 2 has functions as an OS executing section 20 for executing the operating system (OS) program 30, an application executing section 21 for executing the application program 31, and a driver program executing section 22 for executing the driver program 32.

Further, in conformity with specifications such as TWAIN, ISIS, WIA, etc. the driver executing section 22 has functions as a higher driver executing section 22a for delivering image data to the application (executing section) and storing image data in the hard disk and the like, and a lower driver executing section 22b located between the scanner apparatus B and higher driver executing section 22a to deliver image data from the scanner apparatus B to the higher driver executing section 22a.

[Configuration of the Scanner Apparatus]

Figure 2:
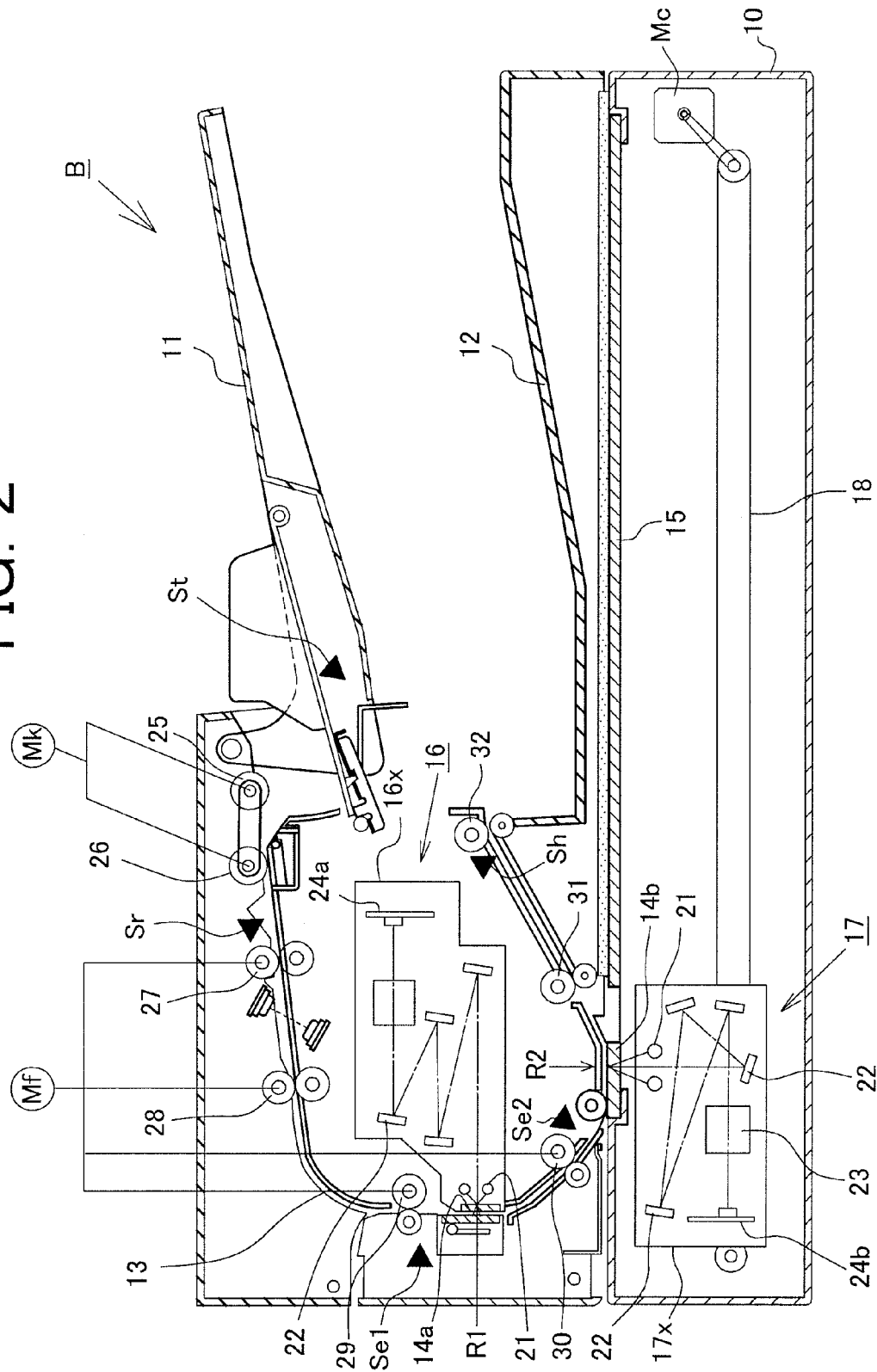
FIG. 2 is an explanatory view of the entire scanner apparatus constituting part of the system of FIG. 1.

FIG. 2 shows a configuration of the scanner apparatus B. The scanner apparatus B is comprised of a paper feed tray 11 to mount original document sheets, a paper discharge tray 12, a transport path 13 for guiding an original document sheet from the paper feed tray 11 to paper discharge tray 12, and read platens 14a, 14b disposed in the transport path 13. The read platen is formed of the first read platen 14a to read an image on the back side of the original document sheet moving in the transport path 13, and the second read platen 14b to read an image on the front side of the original document sheet. In the apparatus as shown in the figure is provided a third platen (flat head platen) 15 to set an original document in a resting manner, separately from the first and second platens 14a, 14b for reading images on the front and back sides of the original sheet moving from the paper feed tray 11 to paper discharge tray 12. The third platen 15 is disposed on the top of a casing 10 to form substantially the same plane with the second platen 14b.

In the first platen 14a is disposed a first image reading unit 16 for reading an image on the back side of an original document sheet moving through the transport path 13 at a predetermined velocity in a first reading position R1, and in the second platen 14b is disposed a second image reading unit 17 for reading an image on the front side of the original document sheet in a second reading position R2. The second image reading unit 17 is configured to be able to move to positions between the second and third platens 14b, 15 to read an image of an original document sheet that is mounted and set on the third platen 15. A carriage 17x is coupled to a traveling belt 18 coupled to a carriage moving motor Mc. Accordingly, by controlling rotation of the carriage moving motor Mc, the carriage 17x is positioned immediately under the second platen 14b or the third platen 15 selectively, and in the third platen 15, is configured to read the image while moving along the original document sheet set on the platen.

[Configuration of the Image Reading Unit]

The first image reading unit 16 and second image reading unit 17 have the same configuration, and one of the units will be described with the same reference numerals assigned. The image reading unit 16 (17) shows the case of reading an image by the shrinkage optical system. A light source 21 emits light to the first platen 14a or second platen 14b, the reflected light from the original document passed through the platen is guided to a condenser lens 23 via mirrors 22, and the condenser lens 23 forms an image on the reading sensor. The reading sensors 24a, 24b shown in the figure are formed of photoelectric conversion elements such as CCDs, and convert the imaging light from the condenser lens 23 into an electrical signal to output.

[Configuration of a Paper Feed Section]

The paper feed tray 11 is formed of a tray to mount a plurality of original document sheets, and the tray is provided with a tray sensor St for detecting the presence or absence of an original document. Then, in the paper feed tray 11 are disposed a pick-up roller 25 for picking up original document sheets, a separation roller 26 for separating the sheets picked up by the pick-up roller 25 into a single sheet, and a resist roller 27 for causing the original document sheet fed from the separation roller 26 to temporarily wait. On the downstream side of the resist roller 27 are provided a first feed roller 28 and a second feed roller 29. Then, the original document sheets from the paper feed tray 11 are separated into a single sheet through the pick-up roller 25 and separation roller 26, and the original document sheet is fed to the resist roller 27, stops temporarily in the resist roller position, and then, by driving and rotating the resist roller 27, is fed to the first and second feed rollers 28, 29 on the downstream side.

The paper feed section is formed of the resist roller 27 and first and second feed rollers 28, 29, and these rollers are coupled to a feed motor Mf, and configured to feed an original document sheet at the same circumferential velocity. In other words, after feeding a preceding original document sheet from the paper feed tray 11 toward the read platen 14a (14b), the apparatus of FIG. 1 picks up and separates a subsequent next original document sheet from the paper feed tray 11, and causes the sheet to wait in the resist roller position on the downstream side (pre-feeding wait control). Then, the original document sheet is fed from the resist roller 27 to the first platen 14a at predetermined timing described later, and such control is the premise.

In addition, in the invention, the paper feed section for feeding an original document sheet to the first platen 14a can be formed of the above-mentioned pick-up roller 25, separation roller 26, resist roller 27 and first and second feed rollers 28, 29. In this case, by control of a CPU 41 described later, the pick-up roller 25 and separation roller 26 are driven and rotated to pick up original document sheets from the paper feed tray 11 to separate into a single sheet. Then, the resist roller 27 and first and second feed rollers 28, 29 are controlled to feed the original document sheet fed from the paper feed tray 11 toward the first platen 14a.

In the transport path 13, a third feed roller 30 is disposed on the downstream side of the first platen 14a to feed the original document sheet from the first platen 14a to the second platen 14b, and on the downstream side of the second platen 14b are disposed a carrying-out roller 31 for scooping the original document sheet from the platen surface and a paper discharge roller 32 in this order. The paper discharge roller 32 is configured to carry out the original document sheet from the carrying-out roller 31 to the paper discharge tray 12.

[Driving Mechanism of the Paper Feed Section]

A driving mechanism of each transport roller disposed in the paper feed tray 11 and transport path 13 is configured as described below, for example. The pick-up roller 25 and separation roller 26 are coupled to a paper feed motor Mk, and forward rotation of the paper feed motor Mk rotates the pick-up roller 25 and separation roller 26 in the paper feed direction. Concurrently therewith, the pick-up roller 25 is configured to fall onto the uppermost sheet on the tray from a standby position above the paper feed tray by rotation of the paper feed motor Mk. Further, by backward rotation of the paper feed motor Mk, the pick-up roller 25 is lifted to the standby position above the paper feed tray to wait.

By forward and backward rotation of the paper feed motor Mk, the original document sheets on the paper feed tray are separated into a single sheet, and the sheet is fed to the resist roller 27, and waits in this position. Then, the resist roller 27 and first, second and third feed rollers 28, 29, 30 are coupled to the feed motor Mf to feed the original document sheet at the same circumferential velocity. Accordingly, the CPU 41 rotates the feed motor Mf forward to rotate the rollers in a predetermined direction, and thereby feeds the original document sheet to the first platen 14a and second platen 14b in this order along the transport path 13 at a predetermined velocity.

[Configuration of a Paper Feed Sensor]

As shown in FIG. 2, in the transport path 13 are disposed a resist sensor Sr, first read sensor Se1, second read sensor Se2 and paper discharge sensor Sh. The resist sensor Sr is disposed between the second read sensor Se2 and paper discharge sensor Sh, and detects that the front end of the original document sheet fed from the paper feed tray 11 reaches the resist roller position. The first read sensor Se1 is disposed upstream from the first platen 14a, and detects the front end of the original document sheet fed from the resist roller 27. The second read sensor Se2 is disposed upstream from the second platen 14b, and detects the front end of the original document sheet fed from the third feed roller 30. Further, the paper discharge sensor Sh detects the front and rear ends of the original document sheet fed from the carrying-out roller 31.

Then, the first read sensor Se1 and second read sensor Se2 detect the front end of the sheet, and are used as reference signals to set an image reading start position and reading end position in the first platen 14a and second platen 14b on the downstream side. Further, each of sensors Se1 and Se2 detects the front and rear ends of the sheet, and is used as a detection signal to judge a jam of the original document sheet. The paper feed tray 11 may be provided with a size detection sensor, not shown, to detect a size of the original document sheet mounted on the tray. In this embodiment, as described later, a user designates an original document size from the PC 1.

The CPU 41 (described later) starts and rotates the paper feed motor Mk for the pick-up roller 25 and separation roller 26 based on a passage signal of the rear end of the original document sheet from the resist sensor Sr, and feeds a subsequent sheet to the resist roller position. Further, the CPU 41 feeds the subsequent sheet toward the first platen 14a from the resist roller position on the condition as described below using a sheet rear end detection signal from the first read sensor Se1 as the reference.

[Control Configuration of the Scanner Apparatus]

The scanner apparatus B is provided with a control board (hereinafter referred to as a "scanner controller") 40 as shown in FIG. 3. The scanner controller 40 has the CPU 41 that is a control section for controlling the scanner apparatus B, ROM 42 for storing the control program, a storage section (RAM) 43 to temporarily store image data, information about the image data and the like, DSP 44 (44a, 44b) for performing correction processing on an image signal from a reading sensor 24, a control port 45 of the scanner apparatus, and the USB controller 48 to transfer the image data to the outside. The control CPU 41 is formed of IC chips for executing control programs to control the reading sensors 24a, 24b (CCD 1, CCD 2 shown in FIG. 3) described previously, light source 21 (lamp 1, lamp 2 shown in FIG. 3), paper feed motor Mk, feed motor Mf, etc. The control CPU 41 functions as an operation control section for executing the control programs stored in the ROM 42, while functioning as a memory control section for controlling the storage section (RAM) 43. Further, as described later, the CPU 41 also has the function as a switching means for switching between paper feed modes corresponding to the information from the PC 1.

Further, the storage section (RAM) 43 has an image processing buffer 43a that is an area to temporarily store image data prior to being processed in the DSP 44, a buffer 43b (transfer data storage section) that is an area to temporarily store image data to be transferred to the PC 1, an information register 43c to store information about each image data (block image data) on the unit of transfer, and a next original information register 43d to store information on whether or not there is a next original to read.

The above-mentioned control configuration will be described. The control CPU 41 conveys control commands to respective driver circuits to control a carriage moving motor Mc, paper feed motor Mk, and feed motor Mf via the control port (GPIO) 45 so as to control a start, halt and rotation velocity of each motor. Similarly, the light sources (lamp 1, lamp 2) 21 of the first and second reading units 16, 17 are controlled to light via the control port (GPIO) 45. Meanwhile, detection signals of the tray sensor St, resist sensor Sr, first and second read sensors Se1, Se2, and paper discharge sensor Sh are conveyed to the control CPU 41 via the control port (GPIO) 45.

Figure 4:
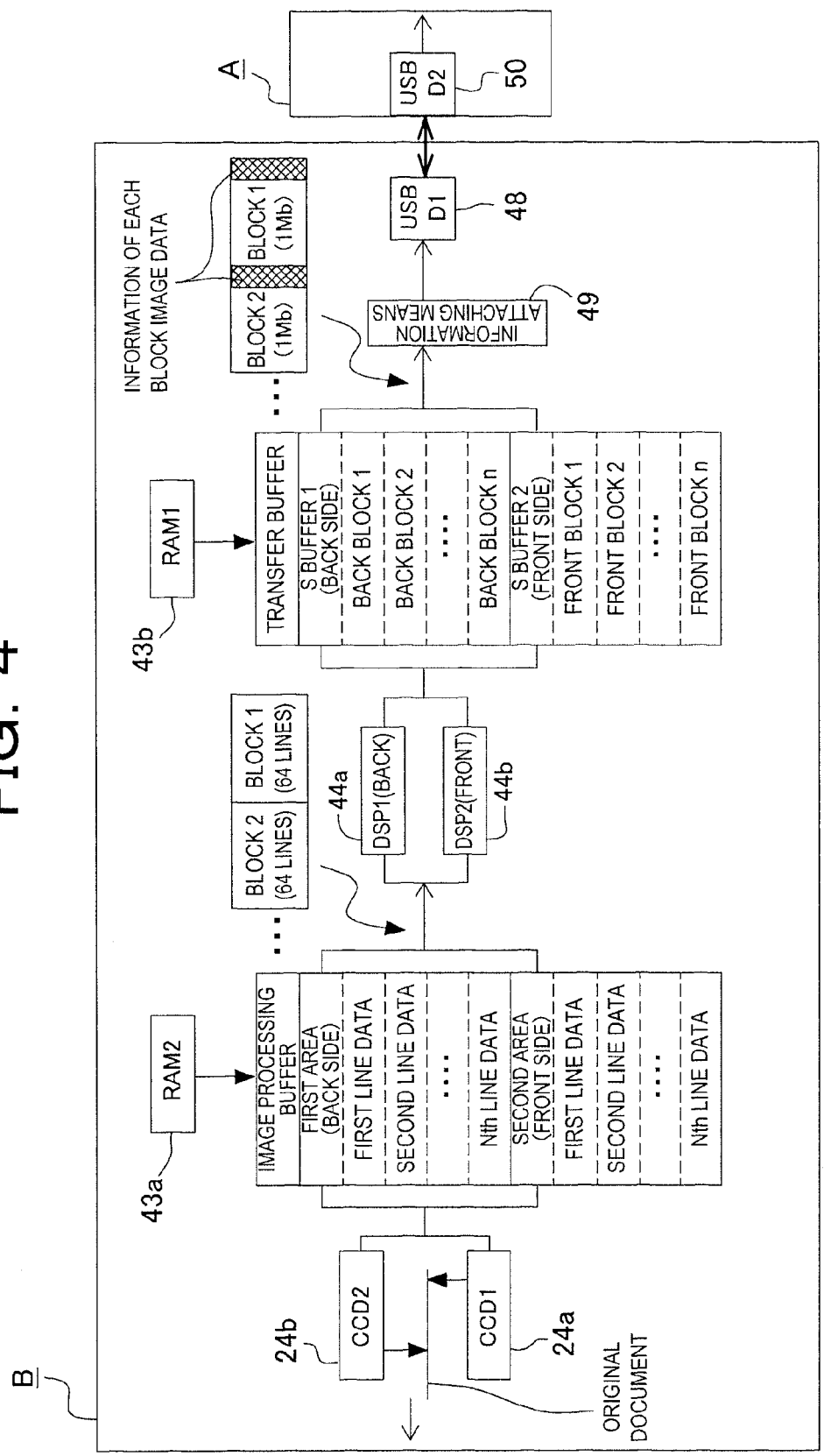
FIG. 4 shows a flow of image data in the scanner apparatus.

The image data from the first reading sensor (CCD 1) 24a for reading a back-side image of the original sheet and the second reading sensor (CCD 2) 24b for reading a front-side image is converted into a digital signal by a converter not shown and loaded to a data bus via a gate array (FPGA) 47 and a scanner interface (SC I/F) 46. The image data is stored in the image processing buffer 43a. Then, as shown in FIG. 4, each image data is subjected to image processing on a block basis by the back-side image processor (DSP1) 44a or front-side image processor (DSP2) 44b, and temporarily stored in the transfer buffer 43b.

When the image data stored in the transfer buffer (transfer data storage means) 43b reaches a predetermined one-transfer block (1 MB in this embodiment), the CPU 41 reads the image data (hereafter, referred to as block image data) corresponding to one transfer, and attaches information about this block image data using an information attaching means 49. The block image data with the information attached is output to a USB controller 50 on the PC 1 side from the USB controller (data transfer section) 48.

The information attaching means 49 is executed by the control CPU 41 according to a predetermined program, and attaches information about each block image data stored in the information register 43c to each block image data. The information in this case is (1) front/back information, (2) final block information (information on whether or not the data is of the final block of the page), (3) next-original presence/absence information, and (4) size information (size information of the block image data).

[Control Configuration of the PC 1]

Figure 5:
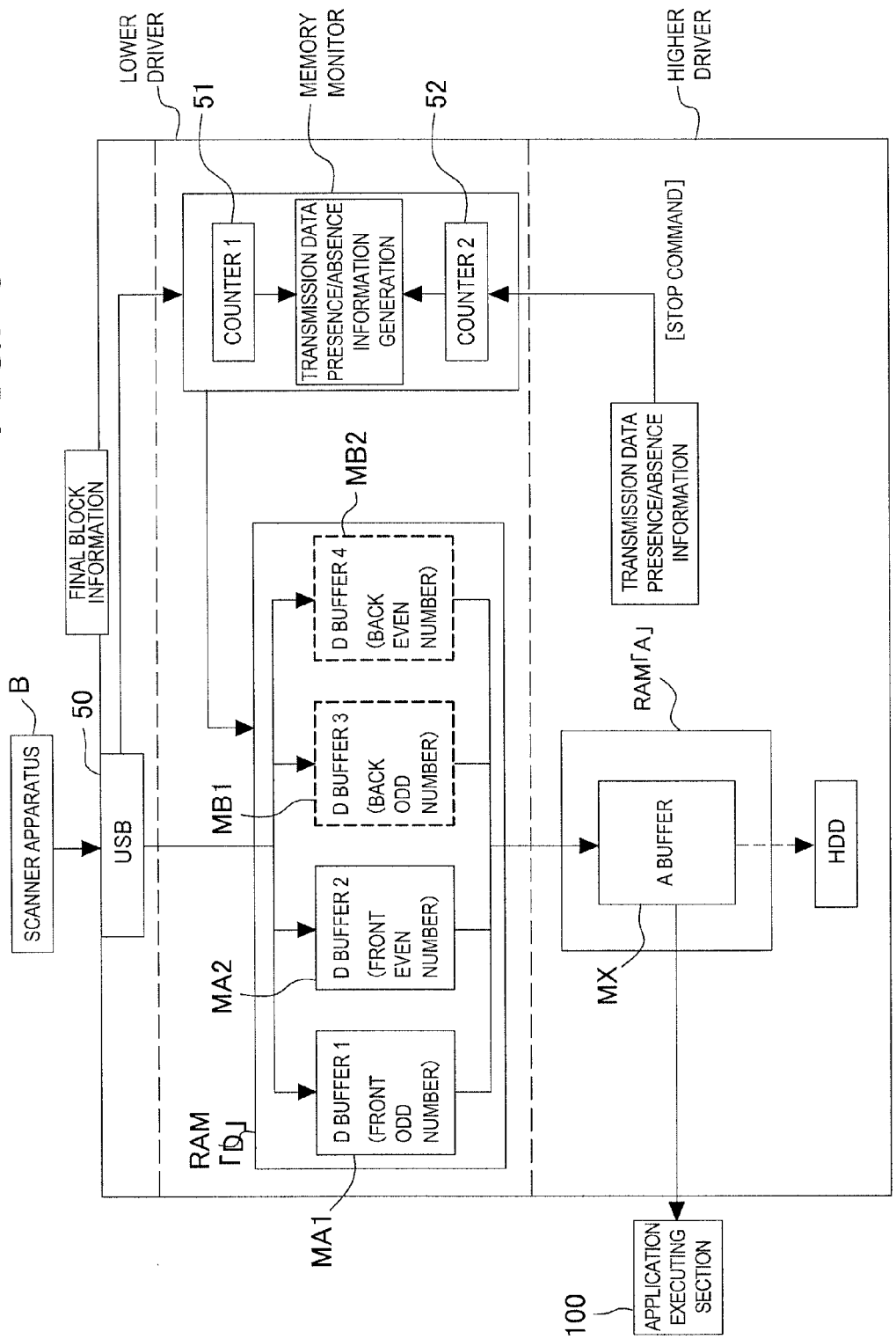
FIG. 5 shows a flow of image data in the data reception apparatus.

An image data processing method in the PC 1 will be described next based on FIG. 5. In addition, the lower driver in FIG. 5 conceptually shows the function for the CPU 2 to execute the lower driver program 32b stored in the storage section 3 to perform as the lower driver executing section 22b. Similarly, the higher driver conceptually shows the function for the CPU 2 to execute the higher driver program 32a stored in the storage section 3 to perform as the higher driver executing section 22a, and a memory monitor shows the function for the CPU 2 to execute a memory monitoring program included in the lower driver program 32b to perform as a memory monitoring section 22c.

The lower driver sets each memory area (MA 1, MA 2, MB 1, MB 2) to store image data in the RAM "D" corresponding to the reading condition. More specifically, as shown in FIG. 5, the driver sets the storage space corresponding to image data of two or more pages of the original document to read. In other words, in the case of the two-side mode, in the RAM "D" are set the memory areas MA1, MA2 capable of storing image data corresponding to two-page front-side image data, and memory areas MB 1, MB2 corresponding to two pages capable of storing the back-side image data. In the case of the one-side mode, in the RAM "D" are set only the memory areas MA1, MA2 capable of storing image data corresponding to two-page front-side image data.

Then, the driver receives the block image data transferred from the scanner apparatus from the USB controller 50 to write in each memory area. This writing is performed on a block basis, and at the time the image data corresponding to one page is written in either buffer of the RAM "D", when an "image data transfer command" has been received from the higher driver executing section 22a, the lower driver reads the image data written in the RAM "D" to deliver to the higher driver executing section 22a (in other words, the image data corresponding to one page in the RAM "D" is copied to the RAM "A".) At the time the image data corresponding to one page is written in either buffer of the RAM "D", when an "image data transfer command" has not been received from the higher driver executing section 22a, the lower driver waits for the reception, and then, reads the image data written in the RAM "D" to deliver to the higher driver executing section 22a. Then, when an available area for image data (transfer block) set beforehand is formed in the RAM "D", the lower driver executing section 22*b* issues a "data transfer instruction command (Read Scan)" to the scanner apparatus B.

Meanwhile, the state of each memory area is monitored by the memory monitor.

The memory monitor performs processing for counting the "final block" information attached to the image data (described later, block image data) transferred from the scanner apparatus B using a counter 1 (51), and processing for counting the number of (stop commands, STOP) transmitted from the higher driver using a counter 2 (52), and using the count information, monitors each memory area, while performing a reply to inquiry about "whether or not a next original sheet is present" from the higher driver, selection of a buffer to transfer, selection of a buffer to write the image data, and the like.

Meanwhile, the higher driver sets the memory area MX for image processing at the RAM "A", for example, which varies with the configuration of the higher driver program. The RAM "A" is set at a space capable of storing image data of one page of the original document to read, and is configured to receive the image data from the RAM "D".

Figure 6:
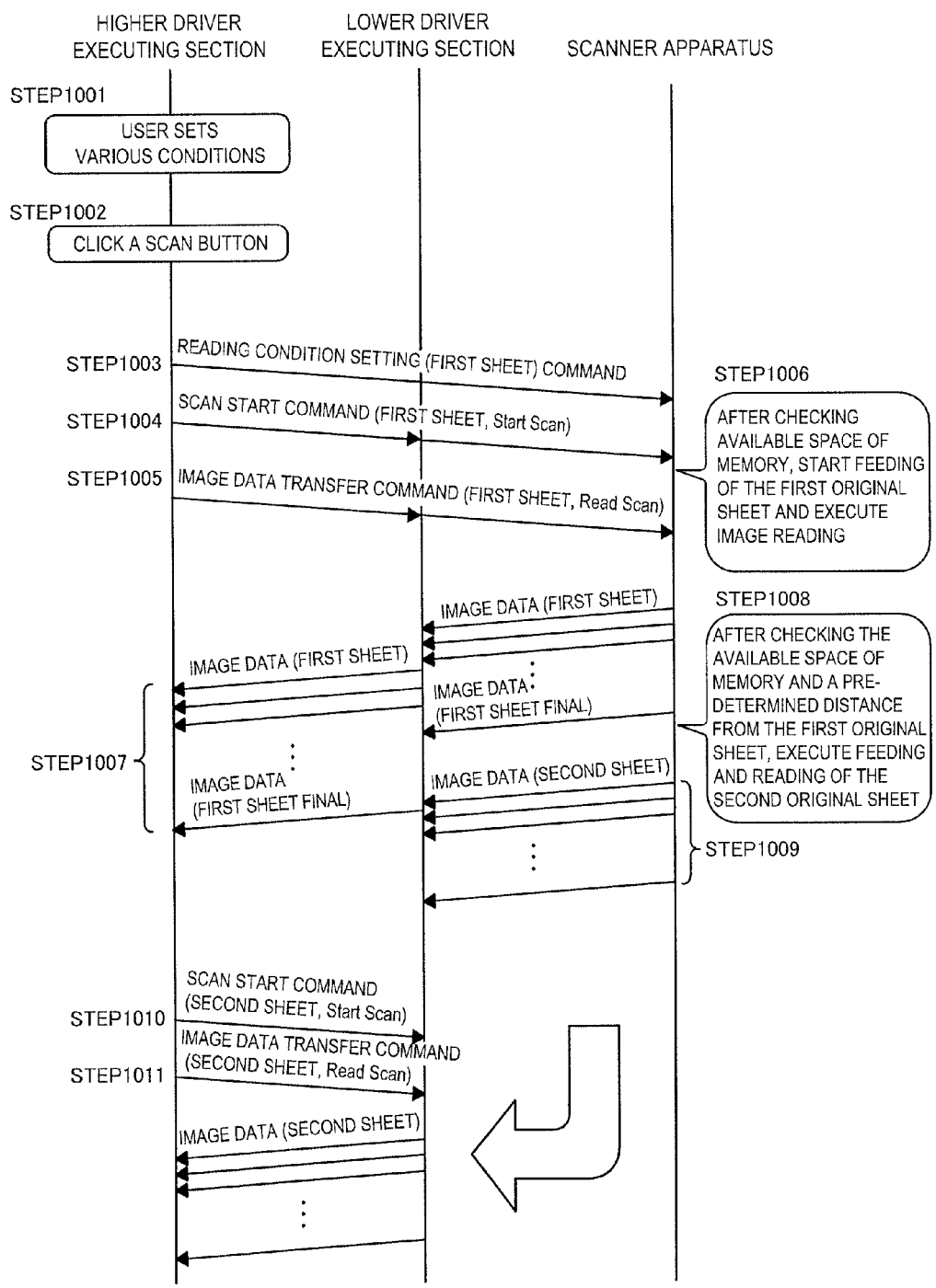
FIG. 6 shows a flow of information in the entire image reading system.

A brief description of the processing procedure is given below according to FIG. 6 using the case of the one-side read mode as an example. First, a user starts the application program that is a user interface of the scanner apparatus on the monitor screen of the output apparatus 6 of the PC 1, and when the user selects "capture of image" on the screen, the driver program (higher driver program) starts to display a setting screen (driver screen) for image reading conditions enabling selection of the resolution, read mode, etc. as shown in FIG. 12 on the monitor screen of the PC 1.

The user sets the reading conditions such as the image, resolution, document size and the like on the driver screen, while selecting an original document set state in the scanner apparatus B, for example, setting an original document sheet on the paper feed tray 11 (ADF mode) or setting an original document sheet on the flat bed platen 15 (flat bed mode) (STEP 1001), and selects a scan button to start scanning (STEP 1002).

When various kinds of setting information (reading condition setting command) set by the user in STEP 1001 are transmitted to the lower driver executing section 22*b*, the lower driver executing section 22*b* transmits the same command as this command to the scanner apparatus B (SETP 1003).

Next, the higher driver executing section 22*a* transmits a "scan start command (Start Scan)" that is a command for requesting a scan start to the lower driver executing section 22*b*, and the lower driver executing section 22*b* transmits the same command as this command to the scanner apparatus B (STEP 1004). Further, the higher driver 22*a* transmits an "image data transfer command (Read Scan)" that is a command for giving instructions for transmission of image data to the lower driver executing section 22*b*, and the lower driver executing section 22*b* further transmits the same command to the scanner apparatus B (STEP 1005).

The scanner apparatus B receiving the "scan start command "Start Scan") drives the paper feed motor Mk and feed motor Mf to transport the first original sheet on the paper feed stacker 11 to the second reading position R2, while reading the original sheet image by the CCD 2 (24*b*) (STEP 1006).

Upon receiving the "data transfer command (Read Scan)" of STEP 1006, the scanner apparatus B transmits the image data to the lower driver executing section 22*b* sequentially while reading the first original sheet, and further, the lower driver executing section 22*b* transmits the image data to the higher driver executing section 22*a* (STEP 1007).

The scanner apparatus B continues to transfer the image data to the lower driver executing section 22*b* after finishing transport and reading of the first original sheet. Then, when it is confirmed that a sufficient available space to store image data corresponding to one page of the second original sheet is reserved in each of the transfer buffer 43*b* and image processing buffer 43*a* of the RAM 43 and that a predetermined interval is made between the first and second original sheets, the scanner apparatus B starts feeding the second original sheet, while starting reading the second original sheet by the CCD 2 (24*b*). In this case, since the reading conditions are common in all the pages, reading is performed on the same conditions as the reading conditions of the first original sheet fed earlier (STEP 1008).

The scanner apparatus B transmits the image data of the second sheet to the lower driver executing section 22*b* while reading the second sheet corresponding to the available status of the memory (RAM "D") of the lower driver executing section 22*b* (STEP 1009), but the lower driver executing section 22*b* has not received the "data transfer command" for the second sheet from the higher driver executing section 22*a*, and therefore, does not transfer the image to the higher driver executing section 22*a*. In addition, in FIG. 6, it is shown that the scanner apparatus B starts feeding and reading of the second original sheet after completing transfer of all the image data of the first sheet to the lower driver executing section 22*b*. However, as described above, it is possible to feed the second original sheet when it is confirmed that a sufficient available space to store image data corresponding to one page of the second original sheet is reserved in each of the transfer buffer 43*b* and image processing buffer 43*a* of the RAM 43 and that an interval with a predetermined length is made from the preceding original sheet as described above, and therefore, feeding and reading of the second original sheet can be started during transferring the image data of the first sheet.

After acquiring all the image data of the first sheet, the higher driver executing section 22*a* transmits the "scan start command (second sheet, Start Scan)" that is a command for requesting a scan start for the second sheet (STEP 1010), and the "data transfer command (second sheet, Read Scan)" that is a command for giving instructions for transmission of image data of the second sheet (STEP 1011) to the lower driver executing section 22*b*. Since the image data of the second sheet is already transferred to the lower driver executing section 22*b* and stored in the RAM "D", the lower driver executing section 22*b* receiving the data transfer command (second page) of STEP 1011 immediately transmits the image data of the second sheet to the higher driver executing section 22*a*.

The outline of the flow of the entire processing is as described above. Described below are details of processing procedures executed by the higher driver executing section 22*a*, lower driver executing section 22*b*, and control CPU 41 according to respective flows.

[Processing of the Higher Driver Executing Section 22*a*]

Figure 7:
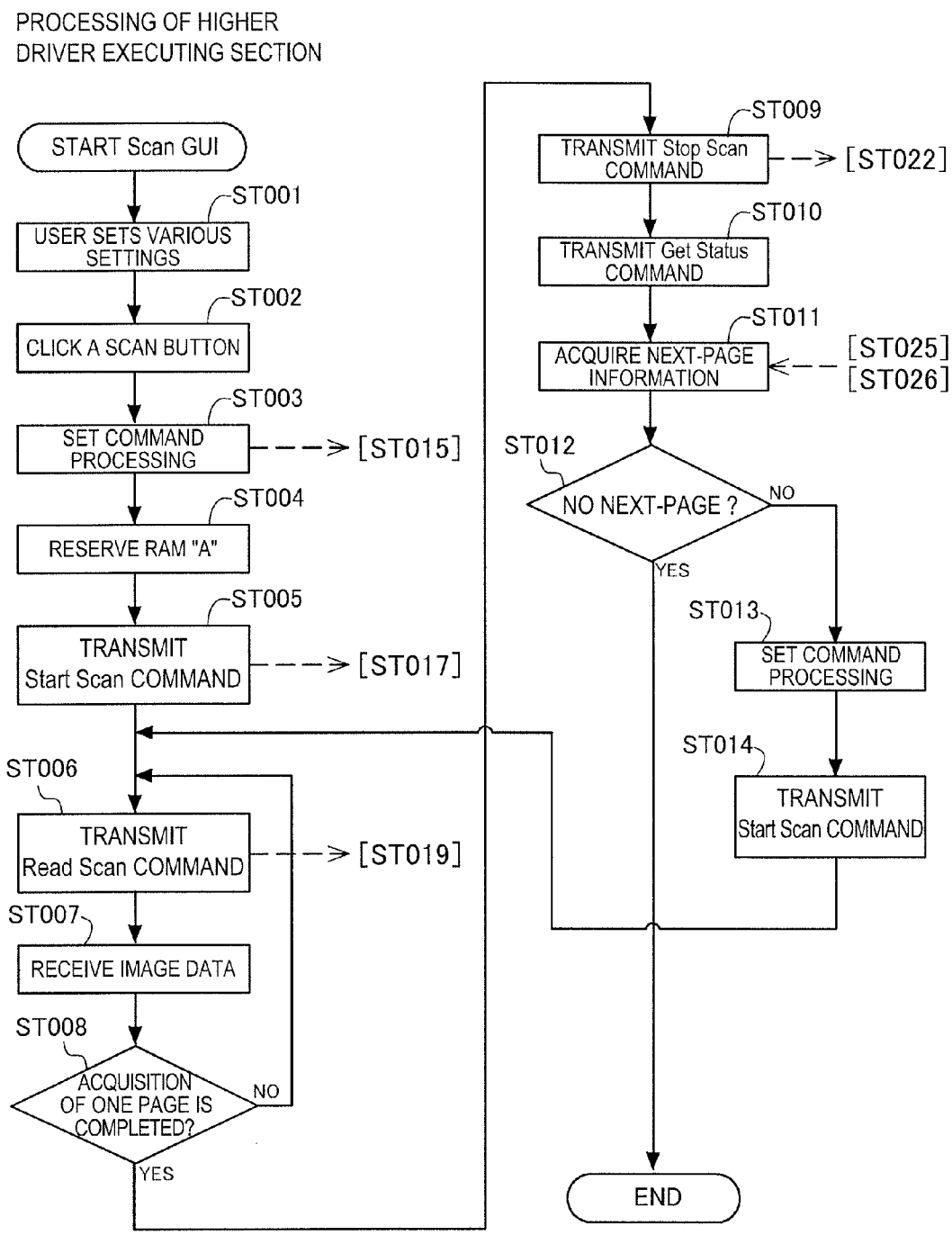
FIG. 7 is a flowchart to show processing of a higher driver executing section.

The processing procedure of the higher driver executing section 22*a* will be described according to the flow of FIG. 7. When a user starts the application program and selects "capture of image" on the screen, the driver program (higher driver program) starts to display a setting screen (driver screen) for image reading conditions enabling selection of the resolution, read mode, etc. as shown in FIG. 12 on the monitor screen of the PC 1.

The user sets the reading conditions such as the image, resolution, document size and the like on the driver screen, while selecting an original document set state in the scanner apparatus B, for example, setting an original document sheet on the paper feed tray 11 (ADF mode) or setting an original document sheet on the flat bed platen 15 (flat bed mode) (ST001), and selects a scan button to start scanning (ST002). In ST001, various kinds of setting information set by the user are transmitted to the lower driver executing section 22b (ST003). In addition, not shown in the figure, after acquiring various kinds of setting information from the higher driver executing section 22a, the lower driver executing section 22b transmits the same setting information to the scanner apparatus B.

Then, after reserving a memory area MX that is a sufficient area to store image data corresponding to one page in the RAM "A" (ST004), the higher driver executing section 22a transmits an "image scan start command (Start Scan)" that is a command for giving instructions for a start of all reading processing of from image scanning of the scanner apparatus B to transmission of image data to the higher driver executing section 22a, and a "data transfer instruction command (Read Scan)" that is a command for giving instructions for transmission of image data (ST005, ST006).

After transmitting the "data transfer instruction command (Read Scan)" in ST006, the higher driver executing section 22a waits for image data of one page to be prepared in the RAM "D" of the lower driver executing section 22b. When the image data of one page is prepared in the RAM "D" of the lower driver executing section 22b, the higher driver executing section 22a receives image data of a predetermined block that is beforehand determined (ST007), and determines whether or not the block data is a final block of the page i.e. whether or not the image data of one page is received (ST008).

By repeating steps ST006 to ST008, the higher driver executing section 22a continues to receive the image data from the lower driver executing section 22b on a block basis, and when receiving the image data of one page, outputs an instruction (stop command Stop Scan, ST009) for instructing the lower driver executing section 22b to stop transmission of image data and the like to the executing section 22b. The executing section 22a delivers the image data of one page to an application executing section 100, and then, release the RAM "A". Next, the executing section 22a transmits a command (Get Status) for instructing the lower driver executing section 22b to transmit status information including whether or not image data of a next page is present (whether or not image data to transmit to the higher driver executing section 22a is present) to the executing section 22b (ST010).

The executing section 22a receives "information of presence/absence of next-page image data" from the lower driver executing section 22b (ST011), and determines "presence/absence of next-page image data" using the information (ST012), and when the image data of the next page is not present, the processing of the higher driver executing section 22a is finished. When there is the image data of the next page, as in steps ST003, ST005, the section 22a transmits various reading conditions (parameters) to the lower driver executing section 22b, and further transmits "Start Scan" to the lower driver executing section 22b (ST013, ST014).

Herein, after transmitting the command "Read Scan" for instructing the section 22b to transmit the image data to the lower driver executing section 22b in step ST006, the waiting time until a reception start of image data differs corresponding to the processing status of the scanner apparatus B and lower driver executing section 22b. In the case of the first original sheet, the scanner apparatus B starts scanning by "Start Scan" from the higher driver executing section 22a, and the waiting time becomes long. In the invention, however, with respect to second and subsequent original sheets, as described above, it is possible to prepare image data of the next original sheet by starting feeding of the next original sheet and executing reading independently irrespective of whether or not "scan start instruction "(Start Scan)" is present, and it is thereby possible to reduce the waiting time. The waiting time occurs corresponding to the number of original sheets, and therefore, the effect by reductions in the waiting time increases on the processing time of the entire system, as the number of original sheets to read increases.

Further, since the scanner apparatus B starts scanning the next original sheet earlier, the next data is already stored in the RAM "D" of the lower driver executing section 22b at the time the higher driver executing section 22a requests the image data, and the waiting time of the higher driver executing section 22a becomes extremely short.

[Operation Flow of the Lower Driver Program]

Figure 8:
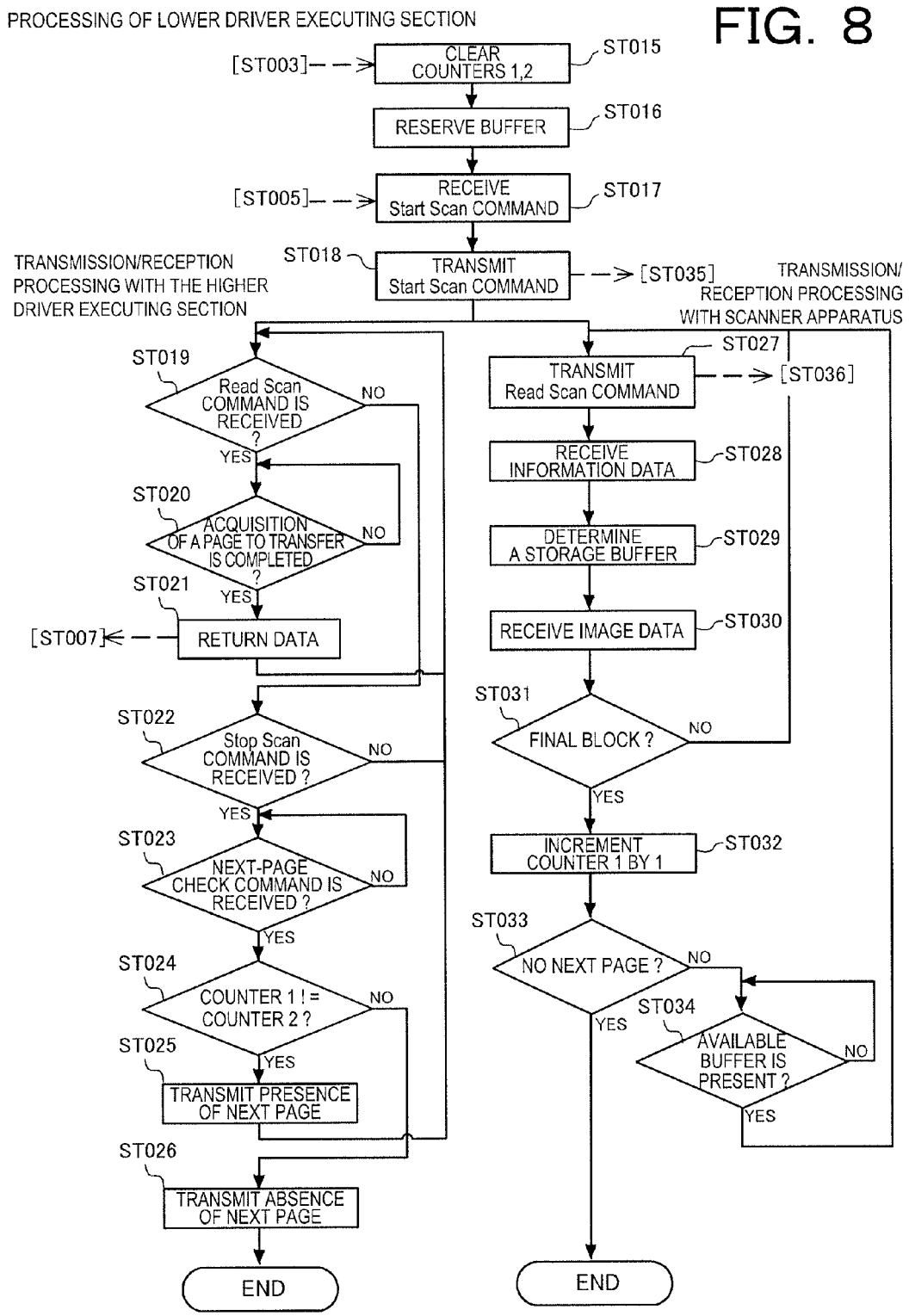
FIG. 8 is a flowchart to explain processing of a lower driver executing section.

The processing procedure of the lower driver executing section 22b will be described according to the flow of FIG. 8.

Upon receiving various reading conditions (parameters) from the higher driver executing section 22a in step ST003, the section 22b makes counts of the counters 1, 2 (51, 52) cleared (zero) (ST015), and prepares the buffers MA1, MA2 of memory areas capable of storing image data of two pages (ST016). Upon receiving "Start Scan" from the higher driver executing section 22a in step ST005 (ST017), the section 22b executes the following processing on transmission and reception of image data and information with the scanner apparatus B.

The section 22b transmits a "scan operation start instruction signal (Start Scan)" and "data transfer instruction command (Read Scan)" (ST018, ST027). In addition, in the case of the first original sheet, since the image data storage area corresponding to two pages is reserved in step ST016, the section 22b transmits "Read Scan" immediately after transmitting "Start Scan". Thereafter, the section 22b waits until the scanner apparatus B starts scanning the original sheet and image data of the first block of the first original sheet is prepared in the transfer buffer RAM 1 (43b), and when the image data is prepared, information about the block image data is transmitted including (1) front/back information, (2) final block information (information on whether or not the block is the final block of the page), (3) next-original presence/absence information, and (4) size information (size of the block image data). Therefore, the section 22b receives the information (ST028), and corresponding to the information, determines a buffer to store from two buffers of the RAM "D" (ST029). More specifically, the section 22b divides the count value of the buffer 1 by "2", and when the remainder is "0", selects the MA 1 (front·odd number), while selecting the MA 2 (front·even number) when the remainder is "1".

Next, since the block image data is transferred, the section 22b receives the image data to write in the buffer determined in step ST029 (ST030). The section 22b determines whether or not the block image data is the final block data of the page from the attached information (final block information) received in step ST028 (ST031). When the data is not the final image data, the section 22b repeats again steps ST027 to ST031a plurality of times until the section 22b receives the final block data to write, and acquires the block data of one page.

When the data is the final block data in step ST0311.e. when all the image data of the first original sheet is written in the buffer MA 1, the section 22b increments the counter 1 (51) by "1" (ST032). Then, the section 22b determines whether or not a next original sheet is present from the attached information of the final block data (i.e. next-original presence/ absence information of the final block data) (ST033), and when the next original sheet is not present, the processing with the scanner B is finished.

When the next original sheet is present in step ST033, the section 22b determines whether or not there is an available space corresponding to one page of image data of the next page (second page) from values of the counters 1, 2 (51, 52), and when there is no space, waits for a space to be made. When the space is made, the section 22b returns to step ST027 to execute up to step ST034, and acquires the image data corresponding to one page of the next-page original sheet from the scanner apparatus B.

Further, after receiving "Start Scan" from the higher driver executing section 22a by step ST005, the lower driver executing section 22b executes the following processing on transmission and redeption of image data and information with the higher driver executing section 22a.

The section 22b determines whether "Read Scan" is received from the higher driver executing section 22a by step ST006 (ST019), and further determines whether or not all the image data of the first original sheet is acquired (image data of the first original sheet is written in the buffer MA 1) from the information of the counters 1, 2 (51, 52) (ST020). More specifically, the section 22b checks that the counter 1 (51) has a higher value than that of the counter 2 (52) by one or more, and thereby determines that the data to transmit to the higher driver executing section 22a is prepared.

When all the image data of the first original sheet is not acquired, the section 22b waits for the image data. Then, when the image data corresponding to one page of the first original sheet is written in the MA 1, the section 22b starts transfer of the image data on a block basis (ST021). Since "Read Scan" is transmitted from the higher driver executing section 22a whenever the section 22a acquires the image data on a block basis from the lower driver executing section 22b, the section 22b returns to step ST019 whenever transmitting the image data on a block basis, repeats steps of steps ST019 to ST021, and transmits the image data of the first original sheet to the higher driver executing section 22a. In addition, in selecting a buffer to transmit to the higher driver executing section 22a, the section 22b divides the count value of the buffer 2 by "2", and when the remainder is "0", selects the MA 1 (front·odd number), while selecting the MA (front·even number) when the remainder is "1".

Then, also after transmitting all the image data of the first original sheet to the higher driver executing section 22a, the section 22b determines again whether "Read Scan" is received or not in ST019, but as described above, since the higher driver executing section 22a transmits the stop command without transmitting "Read Scan" when acquiring the image data corresponding to one page (ST009), the determination in step ST019 is negative, and the processing flow proceeds to step ST022.

In step ST022, the section 22b determines whether or not a stop command is received. When a stop command is not received, the processing flow returns to ST019 again. When it is confirmed that a stop command is received in step ST022, the section 22b determines whether or not the section 22b receives a command (Get Status), from the higher driver executing section 22a by step ST010, for instructing the section 22b to transmit the status information including whether or not there is image data of the next page (whether or not there is image data to transmit to the higher driver executing section 22a) (ST023).

When it is determined that the command (Get Status) is received, the section 22b determines whether or not there is image data of the next page (second page) to transfer to the higher driver executing section 22a from the information of the counter 1 (51) and counter 2 (52) (ST024).

More specifically, the count value of the counter 1 (51) is the number of pages of image data written in the RAM "D", and the count value of the counter 2 is the number of pages of image data transmitted to the higher driver executing section 22a from the RAM "D". Accordingly, when the value of the counter 1 (51) is the same as the value of the counter 2 (52), all of the image data written in the RAM "D" is transmitted to the higher driver executing section 22a, and both of the buffers MA1, MA2 are available for write of the next image data. On the other hand, when the value of the counter 2 (52) is larger than that of the counter 1 (51) (i.e. when the value of the counter 1 is not the same as the value of the counter 2), the RAM "D" has image data that is not transmitted yet to the higher driver executing section 22a and left.

Accordingly, when it is determined that the value of the counter 1 (51) is not the same as the value of the counter 2 (52) in step S024, since there is the next-page (second-page) image data, the section 22b transmits information indicative of the next-page image data being present to the higher driver executing section 22a (ST025), returns to step ST019, and transmits the image data after waiting for "Read Scan" from the higher driver executing section 22a.

When it is determined that the value of the counter 1 (51) is the same as the value of the counter 2 (52) in step S024, the section 22b transmits information indicative of no next-page image data to the higher driver executing section 22a (ST026), and finishes a series of processing on transmission and reception performed between the section 22b and higher driver executing section 22a.

[Operation Flow of the Control CPU]

Upon receiving "Start Scan" from the higher driver executing section 22a by ST018 (ST035), the control CPU 41 executes original document transport processing, reading processing and transfer processing in parallel with one another.

[Original Document Transport Processing]

Figure 11:
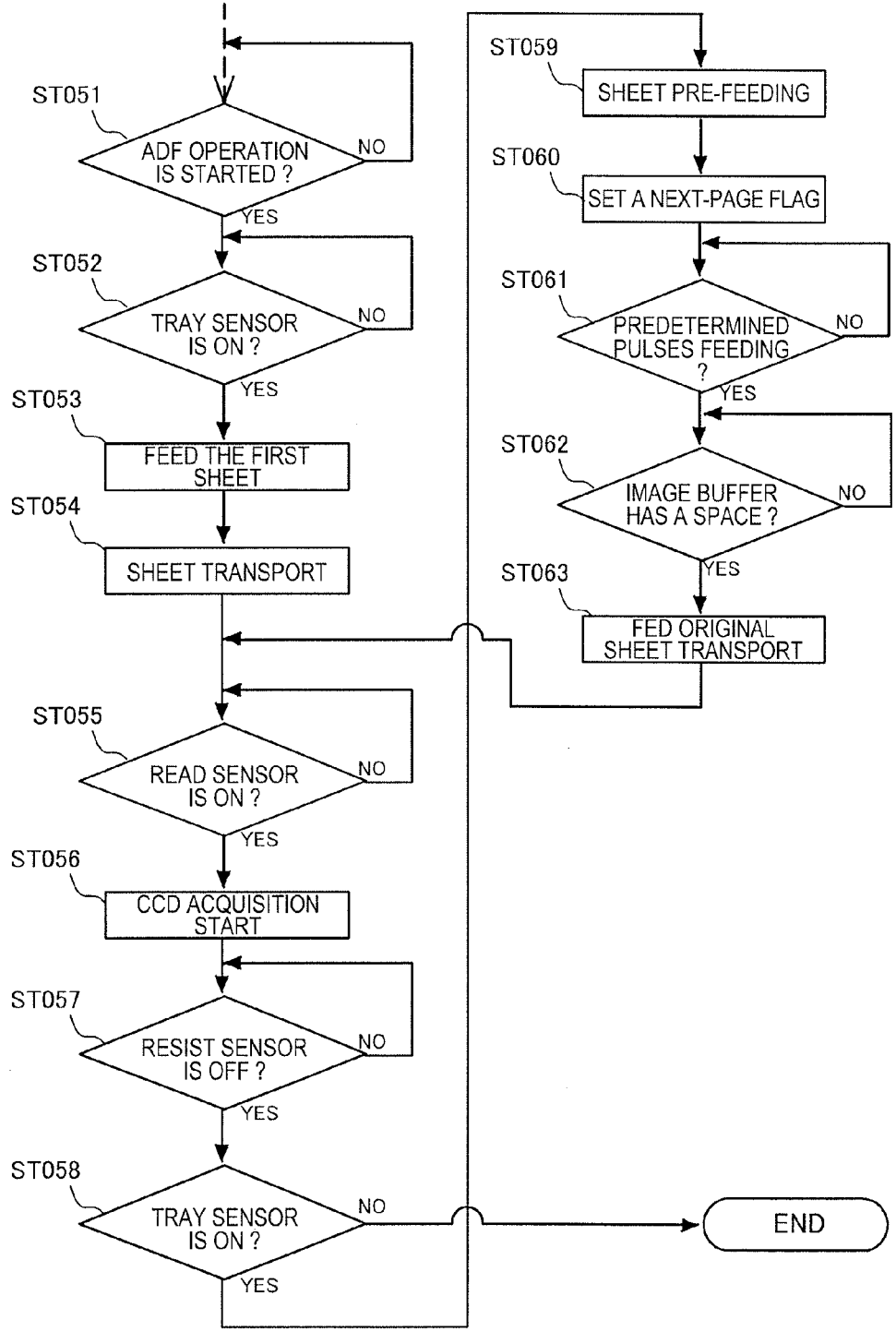
FIG. 11 shows procedures of original document transport and reading operation of the scanner apparatus.

The processing procedure of the scanner apparatus of from original document transport to reading will be described according to the flow in FIG. 11.

A determination whether or not an original document is present on the paper feed tray 11 is made from an output (ON or not) of the tray sensor St (ST051, ST052). When an original document is not present on the paper feed tray 11, the scanner apparatus notifies the user of an error message. In addition, the original document is mounted with the surface to read faced upward (face-up). When the original document is present on the paper feed tray 11, feeding of the first original sheet is started (ST053).

The paper feed motor Mk is rotated forward and backward to rotate the pick-up roller 25, the original document sheets on the paper feed tray are fed and separated into a single sheet by the separation roller 26, the front end of the first original sheet is struck by the halted resist roller 27, and the sheet is temporarily halted. Immediately before the sheet reaches the resist roller 27, the front end of the sheet is detected by the resist sensor Sr.

Next, feeding of the original sheet is started by rotation of the feed motor Mf (ST054). The first original sheet is fed by rotating the feed motor Mf and thereby rotating the resist roller 27, and first, second and third feed rollers 28, 29, 30. When the front end of the first original sheet is detected by the second read sensor Se2 (ST055), reading of original sheet image is started by the CCD 2 (24b) (ST056). Reading of the first original sheet is continued until the rear end comes out of the reading position of the CCD 2 (24b), and during the reading, pre-feeding of the next original sheet (second original sheet) is performed at following timing. When the resist sensor Sr detects the rear end of the first original sheet i.e. when the resist sensor Sr becomes OFF (ST057), a determination whether the next original sheet is present on the paper feed tray 11 is made from an output of the tray sensor Sr. When there is no next original sheet, the original document transport processing is finished (ST058).

When the next original sheet is present, in the same processing as in step ST053, feeding of the next original sheet is performed (ST059). In other words, the paper feed motor Mk is rotated forward and backward to rotate the pick-up roller 25, the original document sheets on the paper feed tray are fed and separated into a single sheet by the separation roller 26, the front end of the second original sheet is struck by the halted resist roller 27, and the sheet is temporarily halted. Then, a flag of the register (next-original information register 43*d*) corresponding to the next-original presence/absence information is set at "presence" (ST060). In addition, when the rear end of the first original sheet comes out of the resist sensor Sr, the resist roller 27 is cut off from driving of the feed motor Mf and halts. Accordingly, when the front end of the second original sheet is struck by the resist roller 27, the resist roller 27 is halted.

Next, when it is confirmed that driving pulses for rotating the feed motor Mf reach the predetermined number of pulses after the resist sensor Sr detects the rear end of the first original sheet in step ST057, i.e. when it is confirmed that a predetermined interval is made between the first and second original sheets (ST061), a determination is made whether each of the transfer buffer 43*a* and image processing buffer 43 of the RAM 43 has a sufficient available space to store image data corresponding to one page of the second original sheet (ST062). When it is confirmed that each buffer has the space, driving of the feed motor Mf is conveyed to the resist roller 27 to start feeding of the second original sheet (ST063). Thus, it is a feature of the invention that the driver program and the operation program of the scanner apparatus B are configured to start image reading of the second and subsequent original sheets by the scanner apparatus B independently irrespective of the presence or absence of a scan start command from the higher driver executing section 22*a*. Then, the processing flow returns to step ST055, and when the front end of the second original sheet is detected by the second read sensor Se2, the CCD 2 (24*b*) starts reading of the second sheet.

Such a procedure is repeated until the original document sheets mounted on the paper feed tray disappear, and the scanner apparatus B thereby performs the reading processing of all the original document sheets mounted on the paper feed tray. As described above, in the case of the first original sheet, feeding is started to perform reading based on "Start Scan" from the higher driver executing section 22*a*. In contrast thereto, in the case of the second original sheet, irrespective of the presence or absence of "Start Scan 1" from the higher driver executing section 22*a*, feeding is started to perform reading by confirming that a predetermined interval is made between the first and second original sheets, and that each of the transfer buffer 43*a* and image processing buffer 43 of the RAM 43 has a sufficient available space to store image data corresponding to one page of the second (next) original sheet.

[Reading Processing]

Figure 10:
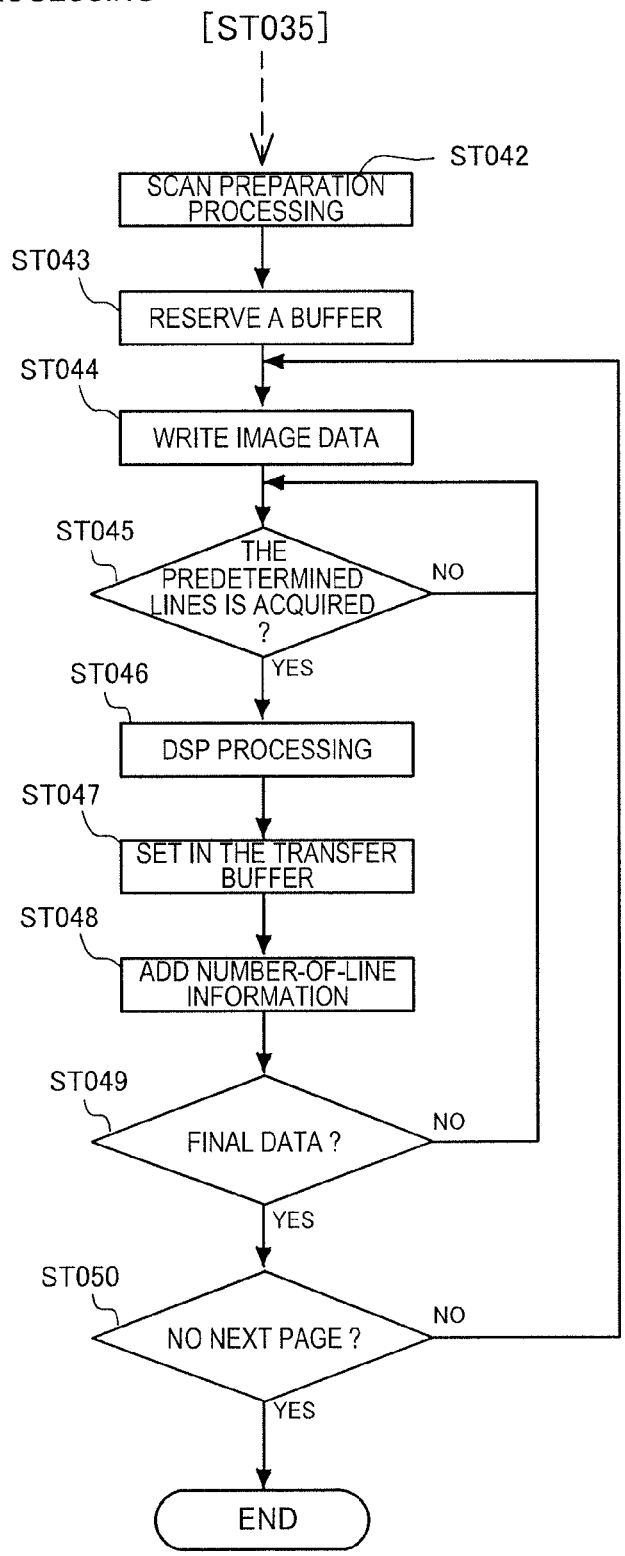
FIG. 10 shows a procedure for the scanner apparatus to write image data in a transfer buffer.

According to the flow in FIG. 10, the processing procedure will be described where image data captured to the data bus via the SCI/F (46) is written in the transfer buffer 43*b*. Upon receiving "Start Scan" from the lower driver executing section 22*b* by step ST018, the scanner apparatus B executes scan preparation processing (ST042). For example, the scanner apparatus B performs gain/offset adjustment, shading data acquisition, and further, since the mode is the ADF mode in this description, shifting of the second image reading unit 17 to a reading position in FIG. 2 from a predetermined home position, or the like. The memory control section (CPU 41) 41*b* reserves a sufficient available space to store image data corresponding to one page of the first original sheet in each of the transfer buffer 43*a* and image processing buffer 43*b* of the RAM 43 (ST043).

When reading of the first original sheet is started in step ST056 of the original document transport processing, the image data from the CCD 24 is captured to the data bus via the FPGA (47), GPIO (45), etc. and writing in the image processing buffer 43*a* is started (ST044). Then, the image data of the first original sheet is written in the image processing buffer 43*a* in the order in which the CCD 24 acquires. When the image data reaches the predetermined number of lines (64 lines in this embodiment) (ST045), the image data corresponding to 64 lines is output from the image processing buffer 43*a*, undergoes various kinds of processing in the DSP 2 (44*b*) (ST046), and written in the transfer buffer 43*b* (ST047).

Then, since the memory control section 41*b* counts the number of lines of the image data written in the transfer buffer 43*b*, the section 41*b* adds the number of lines corresponding to writing in step ST047 (ST048). It is determined whether this count number (the number of lines) reaches the number of lines corresponding to one page of the original document size set by the user in step ST0011. i.e. whether or not the image data written in the transfer buffer 43*b* in step ST047 is the final line of the first original sheet (ST049), and in a negative determination, the processing flow returns to step ST044. Then, steps ST045 to ST049 are repeated until the image data corresponding to one page of the first original sheet is written in the transfer buffer 43*b*, and when writing of the image data corresponding to one page of the first original sheet is finished, it is determined whether or not a next original sheet is present from the "next-original information register 43*d*" of step ST060. When there is the next original, steps ST044 to ST049 are repeated to perform processing on all the original sheets, while when there is no next-original, this processing is finished.

In addition, at the time the image data corresponding to one page is written in the transfer buffer 43*b* in step ST049, with respect to the information about each block image data, in the information register 43*c* is stored (1) front/back information, (2) final block information (information on whether or not the data is of the final block of the page), and (3) size information (size of the block image data). In addition, in (4) next-original presence/absence information is reflected the information of the next-original information register 43*d* in step ST060.

[Transfer Processing]

Figure 9:
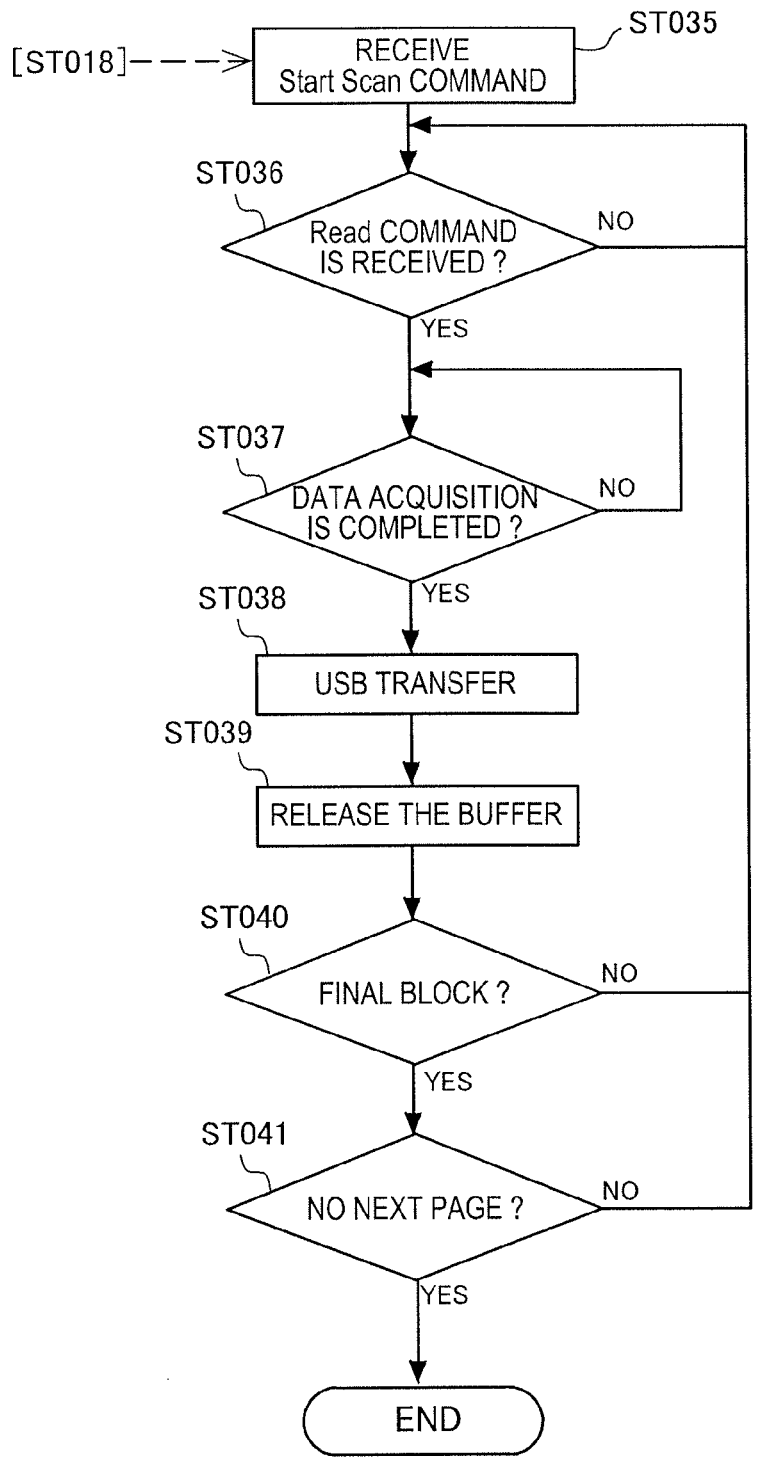
FIG. 9 shows a procedure of data transfer processing for the scanner apparatus to transfer data to the lower driver executing section.

The transfer procedure of the image data stored in the transfer buffer 43*b* will be described according to the flow in FIG. 9. The scanner apparatus B determines whether "Read Scan" is received from the lower driver executing section 22*b* by step ST027 (ST036), and in the case of a positive determination, determines whether or not the transfer buffer 43*b* has image data (block image data, 1 MB) corresponding to one transfer from the information of the memory control section 41*b* (ST037). In the case of a positive determination, the apparatus B attaches the information about the block image data in the information register 43*c* using the information attaching means to transfer (ST038). Then, after transferring the block image data, the apparatus B releases the area in the transfer buffer 43*b* in which the block image data was written to enable another image data to be written again (ST039).

Next, the scanner apparatus B determines whether or not the transferred block image data is the final block of the page (ST040). In the case of a negative determination, steps ST036 to ST040 are repeated (reception of Read Scan 2 and transfer of image block data is repeated) to transfer the block image data up to the final block data. In the case of a positive determination, it is determined whether or not there is information indicative of the next-page original being present (ST041), and when there is the next page, steps ST036 to ST042 are repeated to transfer up to the final block data of the final original sheet (final page). When there is no next page, the transfer processing is finished.

In addition, this embodiment shows the example where the driver is divided into the higher driver conforming to specifications such as TWAIN and the like and the lower driver located between the higher driver and the scanner apparatus, and the lower driver makes adjustments between the scanner apparatus and the higher driver. As another example, there is the case that an application is in conformity with specifications such as TWAIN and the like. In this case, the driver between the application and the scanner apparatus may make adjustments as in the lower driver of this embodiment, and also in this, it is possible to reduce the processing time of the entire system.

Conventionally, since the control CPU 41 of the scanner apparatus B starts feeding and reading of the next original sheet after receiving "scan start instruction (Start Scan)" from the higher driver executing section 22*a*, it takes a time until the higher driver executing section 22*a* acquires the next-page image data after transmitting an "instruction command for data transfer (Read Scan)", but in the invention, as described later, it is possible to prepare image data of the next original sheet by starting feeding the next original sheet and executing reading independently irrespective of the presence or absence of "scan start instruction "(Start Scan)" from the higher driver executing section 22*a*. It is thereby possible to reduce the time required for the higher driver executing section 22*a* to acquire the next-page image data after transmitting an "instruction command for data transfer (Read Scan)". Accordingly, the processing time of the entire system is shorten until the higher driver executing section 22*a* acquires image data corresponding to all the pages, and this effect increases as the number of original document sheets to read increases.

Further, with respect to inquiry about the presence or absence of next-page image data from the higher driver executing section 22*a*, since the presence/absence information is conventionally transmitted (transferred) to the higher driver executing section 22*a* by communication with the scanner apparatus B, this communication requires a time, and the transmission is delayed in the "scan start instruction (Start Scan)" and consequently in the "instruction command for data transfer (Read Scan)". In the invention, however, the lower driver executing section 22*b* replies using the information (final block information) attached to the image data, it is thereby possible to exchange the information within the PC, reduced is the time lapsed until transmission of the "scan start instruction (Start Scan)" and "instruction command for data transfer (Read Scan)", and as a result, it is possible to shorten the processing time of the entire system. This effect also increases as the number of original sheets to read increases.

In addition, this application claims priority from Japanese Patent Application No. 2008-157436 incorporated herein by reference.

What is claimed is:

1. A method of reading document image data scanned by a scanner apparatus and of transferring the image data to a data reception apparatus, comprising:
    setting memory areas for storing the image data in a data storage section of the data reception apparatus and setting a reading condition, upon receipt of a scan start command from the data reception apparatus;
    transmitting the scan start command for instructing the scanner apparatus to start reading operations;
    instructing the scanner apparatus to transmit the image data to a transfer data storage section of the scanner apparatus to receive and store the image data read by the scanner apparatus;
    transferring the image data stored in the transfer data storage section to the data storage section of the data reception apparatus in response to a data transferring request command from a host apparatus;
    transmitting a document end signal received from the scanner apparatus to the data storage section;
    executing feeding of subsequent original document sheets based on available status of the transfer data storage section, without transmitting another scan start command for instructing the scanner apparatus to start the reading operation of the subsequent original document sheets;
    determining whether or not a distance from a rear end of a preceding original document sheet is a predetermined length or more, and concurrently, whether or not an available space of the transfer data storage section is a predetermined amount or more; and
    controlling a feeding section based on determination results from a determining section in feeding the second and subsequent original document sheets.

2. The method of reading document image data according to claim 1, further comprising:
    transferring the image data from the transfer data storage section to the data reception apparatus on a basis of a unit of block with a predetermined length.

3. The method of reading document image data according to claim 1, further comprising:
    transmitting an image data request command for requesting the image data to the scanner apparatus corresponding to available status of the data storage section.

4. The method of reading document image data according to claim 1, further comprising:
    attaching information about the image data together with the image data transmitted to the data reception apparatus; and
    controlling the data reception apparatus using the information attached to the image data.

5. A method of reading document image data scanned by a scanner apparatus and of transferring the image data to a data reception apparatus, comprising:
    setting memory areas for storing the image data in a data storage section of the data reception apparatus and setting a reading condition, upon receipt of a scan start command from the data reception apparatus;
    transmitting the scan start command for instructing the scanner apparatus to start reading operations;
    instructing the scanner apparatus to transmit the image data to a transfer data storage section of the scanner apparatus to receive and store the image data read by the scanner apparatus;
    transferring the image data stored in the transfer data storage section to the data storage section of the data reception apparatus in response to a data transferring request command from a host apparatus;

transmitting a document end signal received from the scanner apparatus to the data storage section;

executing feeding of subsequent original document sheets based on available status of the transfer data storage section, without transmitting another scan start command for instructing the scanner apparatus to start the reading operation of the subsequent original document sheets;

attaching information about the image data together with the image data transmitted to the data reception apparatus;

controlling the data reception apparatus using the information attached to the image data;

determining whether a next block of the image data will be transmitted or not to the data storage section, based on the information attached to the image data; and transmitting data presence/absence information of the next block of the image data.

* * * * *